March 1, 1927.　　　　F. PAMPINELLA　　　　1,619,087
RUBBER SHOCK INSULATED BUMPER
Filed Nov. 5, 1926　　　2 Sheets-Sheet 1
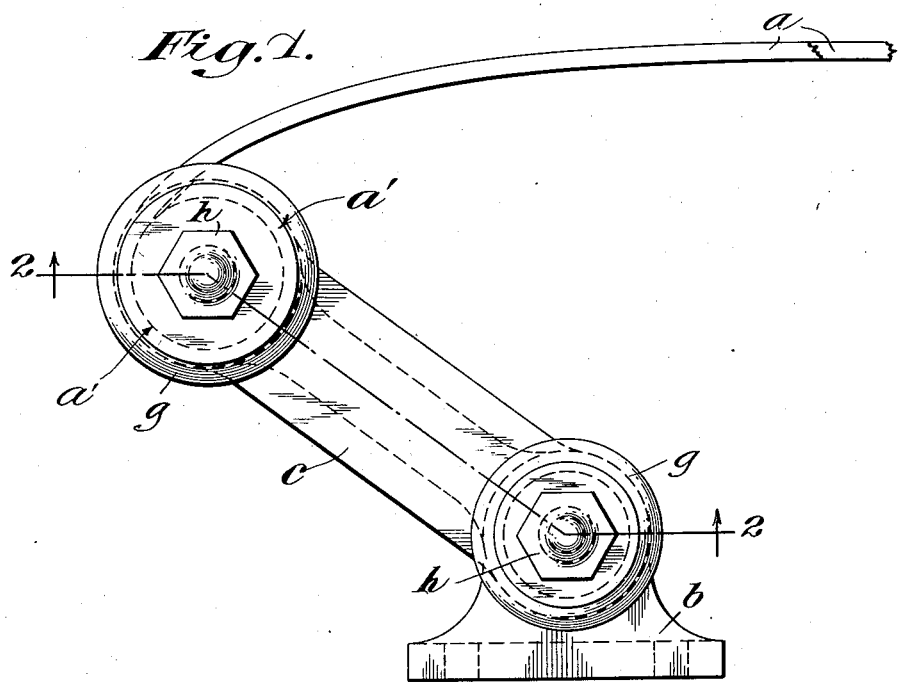
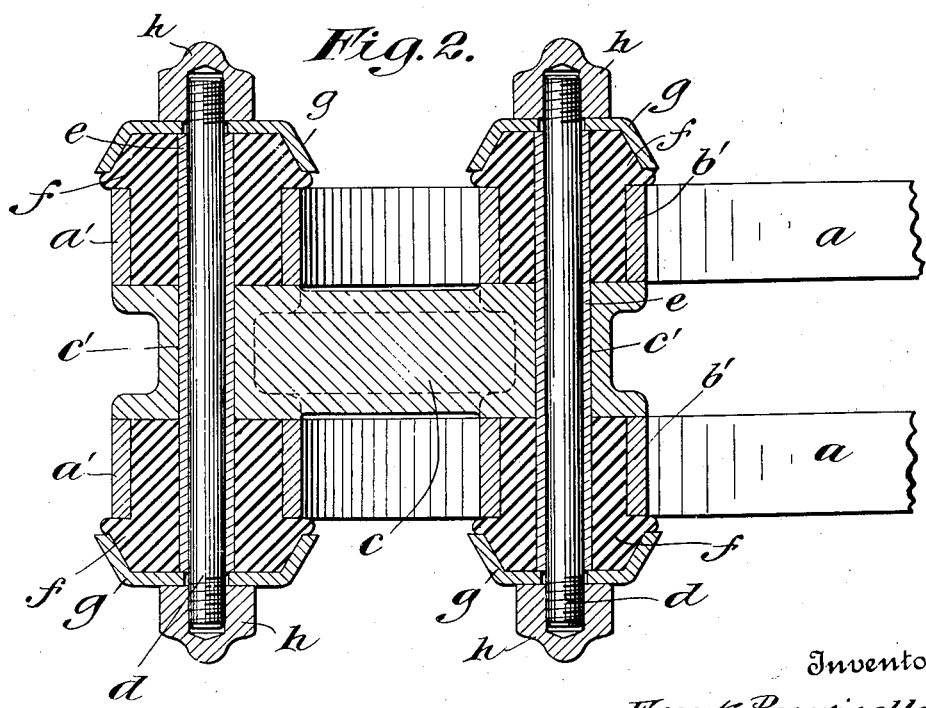
Inventor
Frank Pampinella
By his Attorneys
Redding, Greeley, O'Shea & Campbell March 1, 1927.  F. PAMPINELLA  1,619,087

RUBBER SHOCK INSULATED BUMPER

Filed Nov. 5, 1926  2 Sheets-Sheet 2

Inventor
Frank Pampinella
By his Attorneys

Patented Mar. 1, 1927.

1,619,087

UNITED STATES PATENT OFFICE.

FRANK PAMPINELLA, OF BROOKLYN, NEW YORK, ASSIGNOR TO INTERNATIONAL MOTOR COMPANY, OF NEW YORK, N. Y., A CORPORATION OF DELAWARE.

RUBBER SHOCK-INSULATED BUMPER.

Application filed November 5, 1926. Serial No. 146,336.

In the development of motor vehicles, accessories in the nature of protective devices to prevent damage to the vehicle due to minor collisions, have been designed and various means devised to provide a bumper shock receiving member, which yields sufficiently under impact and yet resumes its normal position after the blow or body imparting the blow has been removed. Merely securing a flexible or resilient bar to the front or rear of the vehicle has not proved to be an adequate protection against such emergencies because under more severe shocks the bar is bent and rendered unfit for further service. It has been suggested to provide springs of metal or even rubber blocks, to absorb the force received by the bumper bar and thus relieve it from the extreme conditions found in normal service.

The present invention seeks to provide a means for absorbing the forces under extreme blows as well as light blows and move the bumper bar back to its normal position after the blow has been received and the obstacle removed. The structure of this invention is designed to be unusually rugged and yet exceedingly elastic so that severe shocks may be received without damaging either the bumper structure or the body upon which it is mounted.

Reference will now be had to the accompanying drawings for a more detailed description of the invention.

Figure 1 is a plan view of one end of the bumper and its connection to the vehicle.

Figure 2 is an elevation, partly in section, taken on line 2—2 of Figure 1.

Figure 3:
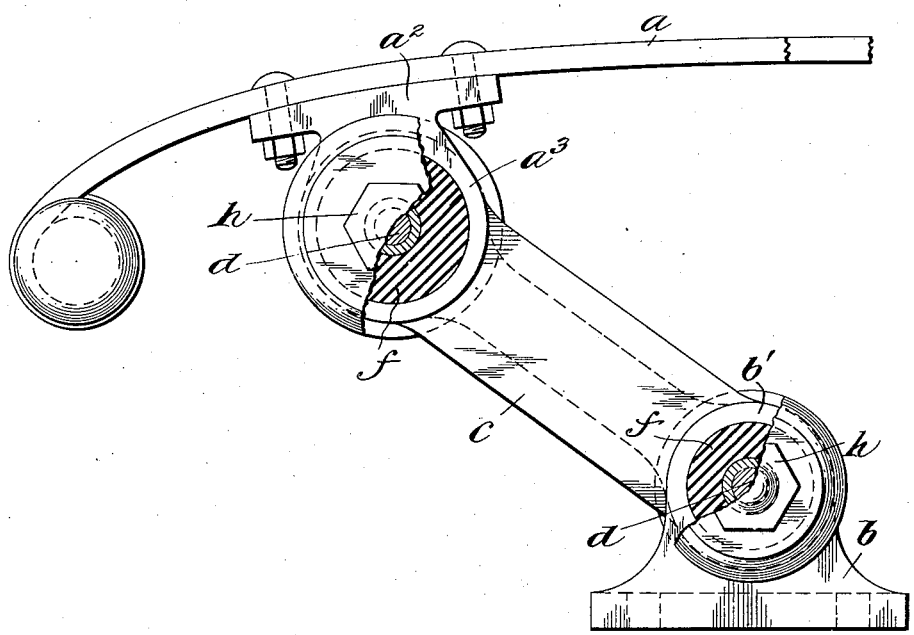
Figure 3 is a plan view, partly broken away and in section of the connection applied to another form of bumper.

In the drawings $a$ represents a bumper bar of any well known construction, it being in the form described, composed of an upper and a lower section. A suitable ring or housing is formed by turning in the end of the bar as shown at $a'$. This turned-in and ring-shaped portion is designed to receive an annulus of rubber as described hereinafter. In the form shown in Figure 3, instead of turning in the end of the bar to receive the rubber block, a bracket $a^2$ is bolted or otherwise secured, to the bumper bar $a$ and has an annular recess or cylindrically hollowed portion $a^3$. For the purposes of this invention the cylindrical portions $a^3$ formed in the bracket $a^2$ and the turned-in back portions $a'$ of the bar $a$ will be referred to as housings for the rubber blocks. Both the upper and lower bumper bars are provided with housings such as described above.

Upon the body to be protected, which is not shown in the figures, it forming no part of the present invention, is secured a bracket $b$. This bracket is provided with an annular housing $b'$ which serves to receive an annular cushioning block such as is housed within the members $a'$, and $a^3$. There are brackets placed at each end of the vehicle corresponding to the number of bumper bars which comprise the shock receiving element, in this case two. Between the brackets and the bumper bars is located a link $c$ which, at each end, is provided with hollowed bearing portions $c'$. Bolts $d$ pass through the hollowed portions of the link and through the respective housings in the brackets and the turned-back portions of the bumper bars. These bolts may be carried in sleeves $e$ which extend along the greater part of their lengths. The sleeves $e$ may be keyed to the link end or may be forced in with a snug fit so that the link and sleeve will form substantially a unitary piece. Within the housing portions of the brackets and bumper bars, there are provided annular blocks $f$ of rubber or other non-metallic and yielding material. These blocks will lie between the ends of the sleeves and the housing portions of the brackets.

At each end of the bolts $d$ are provided seats $g$ and nuts $h$, which when taken up on force the seats $g$ against the annular rubber blocks $f$ to place them under compression.

It will be seen that when the bar $a$ yields under the force of a blow, the link $c$ will be moved pivotally about the bracket $b$, resulting in a pivotal movement in the connections between both the ends of the link and the respective elements connected thereto. This pivotal movement will be taken up by the rubber blocks and results in a torsional twist within the block by reason of the fact that one portion thereof frictionally engages one of the relatively movable elements, and another portion thereof frictionally engages the other of the relatively moving elements. After the blow has been received the torsional stresses set up in the blocks will return the bumper bars to their normal position. It will be seen that this highly flexible and yielding device adapts the structure to receive very severe blows and the stresses resulting therefrom are absorbed in the connections described.

Figure 4:
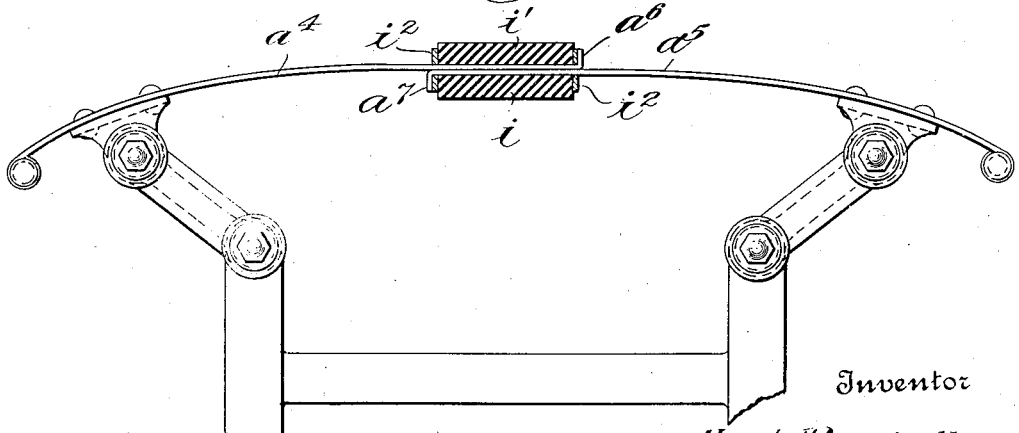
Figure 4 shows the bumper bar together with the connections briefly described above, and a means for permitting elongation of the bar when a blow is received by it.

In Figure 4 a bumper bar is shown which is composed of two sections $a^4$ and $a^5$. When the bars described above receive a blow, it is evident from the connections shown, that there is, a tendency for them to elongate. The structure shown in this figure includes a yielding connection between the two sections of a sectionalized bumper bar which connection permits the bar as a whole to elongate and which, after the blow has been received, returns the sections to their normal position. Such a construction may take the form of a cylindrical block of rubber or other non-metallic yielding material which is provided with an axial hollow portion $i'$ to receive the adjacent ends of two sections. Washers $i^2$ are located at either end of the block $i$ and the adjacent ends of the bumper bar are turned over as at $a^6$ and $a^7$ to overlie the outer faces of the washers. It is evident from the above description, that when a blow is received by the bumper bar, turned-over portions $a^6$ and $a^7$ will be moved toward each other and a compression will be set up in the block $i$. After the blow has been received and the obstacle removed the block $i$ will expand to its normal position and the bumper bar will assume its normal length.

Although a specific embodiment of the invention has been described, it is apparent that changes in design may be made which do not depart from the invention disclosed herein which invention is set forth in the appended claims.

What is claimed is:

1. In a bumper for vehicles and the like, a bumper bar, yielding, non-metallic means carried by the bar, yielding, non-metallic means carried by the body upon which the bar is to be mounted, a link, and means to connect the link to the bar and body through the yielding means.

2. In a bumper for vehicles and the like, a bumper bar, yielding, non-metallic means carried by the bar, yielding, non-metallic means carried by the body upon which the bar is to be mounted, a link, and means to mount the link between the yielding means to place the latter under compression and 'cause it to yield under torsion when a blow is received by the bar.

3. In a bumper for vehicles and the like, a bumper bar, yielding, non-metallic means carried by the bar, yielding, non-metallic means carried by the body upon which the bar is to be mounted, a link, bolts passing through the yielding means and carried by opposite ends of the link, caps bearing upon the yielding means and means carried by the bolts to engage the caps and to place the yielding material under compression.

4. In a bumper for vehicles and the like, a bumper bar, links pivotally mounted at its ends, means for pivotally mounting the links to the body to be protected and means to resist yieldingly, elongation of the bar when it receives a blow.

5. In a bumper bar for vehicles and the like, a bumper bar, links pivotally mounted at its ends, means for pivotally mounting the links to the body to be protected and yielding non-metallic means to resist, yieldingly, elongation of the bar when it receives a blow.

6. In a bumper for vehicles and the like, a sectionalized bumper bar, yielding non-metallic means carried by the bar, yielding non-metallic means carried by the body upon which the bar is to be mounted, a link, means to mount the link between the yielding means to place the latter under compression and cause it to yield under torsion when a blow is received by the bar, and yielding non-metallic means mounted between the sections to resist elongation of the bar while receiving a blow.

This specification signed this 3rd day of November A. D. 1926.

FRANK PAMPINELLA.